United States Patent Office 3,038,910
Patented June 12, 1962

3,038,910
SYNTHESIS OF STEROIDS
Josef Fried, New Brunswick, N.J., assignor to Olin Mathieson Chemical Corporation, New York, N.Y., a corporation of Virginia
No Drawing. Filed May 27, 1955, Ser. No. 511,783
7 Claims. (Cl. 260—397.3)

This invention relates to the synthesis of valuable steroids.

One of the objects of this invention is the provision of an advantageous process of preparing steroids of the pregnane (including allopregnane, pregnene and pregnadiene) series having a 14,15-double bond.

Another object of this invention is the provision of steroids of the pregnane (including allopregnane, pregnene, and pregnadiene) series having a 14,15-double bond, which compounds are useful for their own physiological action.

Still another object of this invention is the provision of 15-(organic-sulfonyloxy)-progesterones, useful as intermediates in the preparation of the 14,15-double-bonded steroids of this invention.

The new steroids of this invention comprise: (a) 15-(organic-sulfonyloxy)-progesterones; (b) 14-dehydroprogesterone; (c) 14-dehydro-allopregnane-3,20-dione; and (d) 14-dehydropregnane-3,20-dione.

The new 14-dehydroprogesterone of this invention may be prepared by a process essentially comprising converting either 15α-hydroxyprogesterone or 15β-hydroxyprogesterone to the corresponding organic sulfonate ester to form the novel organic sulfonic acid esters of this invention, and then removing the organic sulfonic acid moiety to form a 14,15-double bond.

The 15-hydroxyprogesterone steroids useful as starting materials in the processes of this invention can be prepared by the methods disclosed by Josef Fried et al. in their application, Serial No. 372,798, filed August 6, 1953, and now Patent No. 2,753,290, granted July 3, 1956.

The preparation of the organic sulfonic acid esters of the 15-hydroxyprogesterones is preferably accomplished by reacting a 15-hydroxyprogesterone with an organic sulfonyl halide (sulfonyl chlorides are preferred but other halides such as bromides and iodides may be used). Although any organic chloride is utilizable, and suitable reagents include the aliphatic sulfonyl chlorides (e.g. the alkanesulfonyl chlorides) and the aromatic sulfonyl chlorides (e.g. the benzenesulfonyl chlorides), the preferred sulfonyl chlorides are those wherein the organic radical is a hydrocarbon of less than nine carbon atoms, as exemplified by the lower alkanesulfonyl chlorides [e.g. ethanesulfonyl chloride and especially methanesulfonyl chloride (mesyl chloride)] and the monocyclic hydrocarbon aromatic sulfonyl chlorides [e.g. benzenesulfonyl chloride and p-toluenesulfonyl chloride (tosyl chloride)]. The reaction is carried out in accordance with the general method disclosed in my U.S. application, Serial No. 417,489, filed March 10, 1954; and in the following examples, by reacting the 15-hydroxyprogesterone and sulfonyl halide in the presence of a tertiary organic base, such as pyridine. The reaction results in the production of one of the new intermediates of this invention, a progesterone having an organic sulfonyloxy radical in the 15-position (alpha or beta, depending on the configuration of the starting 15-hydroxyprogesterone).

These intermediates are then reacted with an alkali metal salt of a lower fatty acid in a substantially anhydrous liquid lower fatty acid (e.g. sodium acetate in glacial acetic acid, or potassium formate in formic acid) to split off the organic sulfonic acid moiety, thereby forming the 14-dehydroprogesterone of this invention. This conversion can also be effected by treatment with an alkali metal halide (e.g. sodium iodide, potassium iodide or lithium bromide) in an organic solvent such as acetone or glacial acetic acid, preferably the latter, or with an organic base such as collidine.

To prepare the 14-dehydroallopregnane-3,20-dione and 14-dehydropregnane-3,20-dione derivatives of this invention, 14-dehydroprogesterone is catalytically hydrogenated by treatment with at least one mole of hydrogen per mole of steroid. Suitable hydrogenation catalysts utilizable in effecting this reaction are platinum, Raney nickel, and palladium, although any other known hydrogenation catalyst may be employed. The reaction results in a mixture of 14-dehydroallopregnane-3,20-dione and 14-dehydropregnane-3,20-dione derivatives, which can then be separated as more fully described hereinafter in Example 4.

The 14-dehydroprogesterone of this invention is an active material which possesses progestational activity. Thus, this new steroid can be administered instead of, and in the same manner as, progesterone in the treatment of functional uterine bleeding and amenorrhea. The dosage for such administration is, of course, dependent on the relative activity of the new steroid and progesterone. The 14-dehydroallopregnane-3,20-dione and 14-dehydropregnane-3,20-dione derivatives are also new steroids which are active asmyotrophic or protein-anabolic agents.

The following examples are illustrative of the invention (all temperature being in centigrade):

EXAMPLE 1

*15α-Hydroxyprogesterone Mesylate*

To a solution of 60 mg. of 15α-hydroxyprogesterone in 4 ml. of dry pyridine is added at 0° a solution of 42 mg. of methanesulfonyl chloride in 1.3 ml. of chloroform. The mixture is allowed to remain at 0° for 18 hours and is then taken up in chloroform and ice water. After separation of the phases, the chloroform solution is washed with dilute sulfuric acid, water, dilute sodium bicarbonate solution and again with water and finally dried over sodium sulfate. Evaporation of the solvent in vacuo leaves a crystalline residue (about 85 mg.), which after recrystallization from ethanol affords pure 15α-hydroxyprogesterone mesylate having the following properties, M.P. about 155–156° (dec.); $[\alpha]_D^{23}+158°$ (c., 0.90 in chloroform);

$\lambda_{max.}^{alc.}$ 239 mμ (ε=20,900);

$\lambda_{max.}^{Nujol}$ 5.90μ (20-keto), 6.05μ, 6.22μ ($\Delta^4$-3-keto)

*Analysis.*—Calcd. for $C_{22}H_{32}O_5S$ (408.48): C, 64.68; H, 7.90; S, 7.84. C, 64.78; H, 7.78; S, 7.90.

EXAMPLE 2

*15β-Hydroxyprogesterone Mesylate*

To a solution of 32 mg. of 15β-hydroxyprogesterone in 2 ml. of anhydrous pyridine is added a solution of 133 mg. of methanesulfonyl chloride in 4.4 ml. of chloroform. The mixture is allowed to remain at 0° for 70 hours and is then worked up as described in Example 1. Since 15β-hydroxyprogesterone mesylate is extremely unstable and loses methanesulfonic acid readily all the operations have to be carried out with extreme care and at low temperature. The crystalline residue remaining after removal of the chloroform in vacuo is recrystallized from benzene-hexane taking care that the temperature never rises above 23°. The mesylate melts at about 114–116° (dec.) and has $[\alpha]_D^{23}+81°$ (c., 0.60 in chloroform).

*Analysis.*—Calcd. for $C_{22}H_{32}O_5S$ (408.48): S, 7.84; S, 6.84.

Attempts to recrystallize this substance at higher temperatures or from alcohol results in elimination of methanesulfonic acid and in the formation of 14-dehydroprogesterone.

If ethanesulfonyl chloride, propanesulfonyl chloride, benzenesulfonyl chloride or p-toluenesulfonyl chloride is substituted for the methanesulfonyl chloride in the procedures of Examples 1 or 2, the corresponding ethanesulfonic acid, propanesulfonic acid, benzenesulfonic acid and p-toluenesulfonic acid esters, respectively, are formed.

EXAMPLE 3

14-Dehydroprogesterone

A solution of 636 mg. of 15β-hydroxyprogesterone mesylate and 1.3 g. of sodium acetate in 25 ml. of glacial acetic acid is refluxed for 50 minutes. After removal of the acetic acid in vacuo the residue is taken up in chloroform, the chloroform solution is washed with water, dilute sodium bicarbonate and again with water and then dried over sodium sulfate. Removal of the solvent in vacuo leaves a crystalline residue (about 461 mg.) which after recrystallization from acetone-hexane furnishes about 250 mg. of 14-dehydroprogesterone. The pure substance has the following properties, M.P. about 141–143°; $[\alpha]_D^{23}+$ 132° (c., 0.9 in chloroform);

$\lambda_{max.}^{alc.}$ 239 m$\mu$ ($\epsilon$=17,900);

$\lambda_{max.}^{Nujol}$ 5.87$\mu$ (20-keto), 6.00$\mu$, 6.20$\mu$ ($\Delta^4$-3-ketone)

*Analysis.*—Calcd. for $C_{21}H_{28}O_2$ (312.44): C, 80.73; H, 9.03. C, 80.50; H, 8.81.

An additional amount of 14-dehydroprogesterone is obtained by chromatography of the mother liquors on sulfuric acid-washed alumina, and elution of the column with a mixture of 1 vol. of benzene and 2 vol. of hexane.

Treatment of 15α-hydroxyprogesterone mesylate with sodium acetate in glacial acetic acid under the above-described conditions likewise furnishes 14-dehydroprogesterone identical in all respects with the material obtained from the 15β-mesylate.

In a similar manner, 15α-hydroxyprogesterone ethanesulfonate, 15β-hydroxyprogesterone ethanesulfonate, 15α-hydroxyprogesterone propanesulfonate, 15β-hydroxyprogesterone propanesulfonate, 15α-hydroxyprogesterone benzenesulfonate, 15β-hydroxyprogesterone benzenesulfonate, 15α-hydroxyprogesterone p-toluenesulfonate and 15β-hydroxyprogesterone p-toluenesulfonate, when subjected to the reaction of Example 3, yield 14-dehydroprogesterone.

EXAMPLE 4

14-Dehydroallopregnane-3,20-Dione and 14-Dehydropregnane-3,20-Dione

To a suspension of 60 mg. of 5% palladium on barium sulfate catalyst in 2.5 ml. of ethyl acetate which has been pre-reduced with hydrogen is added a solution of 60 mg. of 14-dehydroprogesterone in 1.5 ml. of ethyl acetate. Hydrogen uptake is complete after 22 minutes and amounts to 5.9 ml. equal to 1.23 moles/mole of substrate. After centrifugation of the catalyst, the ethyl acetate solution is evaporated to dryness in vacuo and the residue separated into two components by fractional crystallization from methanol. The more insoluble component melts at about 187–192° and represents 14-dehydroallopregnane-3,20-dione. The more soluble and more abundant component represents 14-dehydropregnane-3,20-dione and has the following properties, M.P. about 158–160°, $[\alpha]_D^{23}+73°$ (c., 0.40 in chloroform);

$\lambda_{max.}^{Nujol}$ 5.82$\mu$ (3-keto), 5.89 (20-keto)

*Analysis.*—Calcd. for $C_{21}H_{30}O_2$: C, 80.21; H, 9.62. C, 80.37; H, 9.42.

The invention may be otherwise variously embodied within the scope of the appended claims.

I claim:

1. A 15-(organic-sulfonyloxy)-progesterone of the general formula

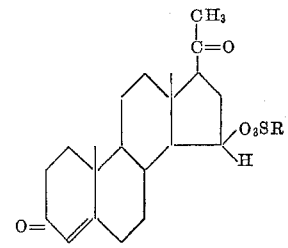

wherein R is a hydrocarbon having less than nine carbon atoms.
2. The compound of claim 1 wherein R is lower alkyl.
3. The compound of claim 1 wherein R is methyl.
4. 15α-methanesulfonyloxyprogesterone.
5. 15β-methanesulfonyloxyprogesterone.
6. 14-dehydroallopregnane-3,20-dione.
7. 14-dehydropregnane-3,20-dione.

References Cited in the file of this patent
UNITED STATES PATENTS

| | | |
|---|---|---|
| 2,670,358 | Murray | Feb. 23, 1954 |
| 2,702,812 | Skull | Feb. 22, 1955 |
| 2,734,907 | Levin | Feb. 14, 1956 |
| 2,756,179 | Fried et al. | July 24, 1956 |